United States Patent
Ketfi-Cherif et al.

(10) Patent No.: US 8,457,822 B2
(45) Date of Patent: Jun. 4, 2013

(54) METHOD AND SYSTEM FOR CONTROLLING A POWER UNIT WITH POWER BYPASS

(75) Inventors: Ahmed Ketfi-Cherif, Elancourt (FR); Mehdi Gati, Antony (FR); Michel Mensler, Montigny-le-Bretonneux (FR); Philippe Pognant-Gros, Tassin la Demi-Lune (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 335 days.

(21) Appl. No.: 12/738,434

(22) PCT Filed: Sep. 30, 2008

(86) PCT No.: PCT/FR2008/051747
§ 371 (c)(1),
(2), (4) Date: Nov. 29, 2010

(87) PCT Pub. No.: WO2009/050402
PCT Pub. Date: Apr. 23, 2009

(65) Prior Publication Data
US 2011/0060489 A1    Mar. 10, 2011

(30) Foreign Application Priority Data
Oct. 18, 2007   (FR) ...................... 07 58413

(51) Int. Cl.
*B60W 20/00*    (2006.01)
(52) U.S. Cl.
USPC ........................... 701/22; 180/65.25; 903/902

(58) Field of Classification Search
USPC .................. 701/22; 180/65.21, 65.1, 65.265, 180/65.25; 307/9.1, 10.1; 903/902
See application file for complete search history.

(56) References Cited

U.S. PATENT DOCUMENTS

| | | | |
|---|---|---|---|
| 6,338,391 B1 * | 1/2002 | Severinsky et al. ........ 180/65.23 |
| 6,722,457 B2 | 4/2004 | Yamaguchi et al. |
| 6,891,302 B1 * | 5/2005 | Gabrys ........................ 310/178 |
| 2007/0114081 A1 | 5/2007 | Iwanaka et al. |
| 2011/0190971 A1 * | 8/2011 | Severinsky et al. ............. 701/22 |

FOREIGN PATENT DOCUMENTS

| | | |
|---|---|---|
| DE | 199 09 424 | 8/2000 |
| EP | 1 219 485 | 7/2002 |
| JP | 11-117840 | 4/1999 |
| JP | 2004-340010 | 12/2004 |

OTHER PUBLICATIONS

Office Action mailed Nov. 27, 2012 in Japanese Patent Application No. 2010-529433 (with English-language Translation).

* cited by examiner

*Primary Examiner* — Yonel Beaulieu
(74) *Attorney, Agent, or Firm* — Oblon, Spivak, McClelland, Maier & Neustadt, L.L.P.

(57) ABSTRACT

A method for controlling a hybrid power unit with power bypass for an automobile including at least two driving wheels, wherein the power unit includes a thermal engine, at least two electric machines, and an infinitely variable transmission mechanically connecting the thermal engine, the two electric machines, and the driving wheels. In the method, an initially stopped thermal engine is brought, in an independent manner and in plural operation phases, to a rotation speed that is sufficient for participating in propulsion of the vehicle, the vehicle moving under action of the electric machines.

7 Claims, 2 Drawing Sheets

METHOD AND SYSTEM FOR CONTROLLING A POWER UNIT WITH POWER BYPASS

BACKGROUND OF THE INVENTION

The present invention relates to hybrid propulsion systems and more particularly to the management of a heat engine in a vehicle equipped with an electric infinitely variable transmission.

Hybrid propulsion systems are notably either of series type or of parallel type. In series-type systems, the heat engine is directly coupled with the electric engines, the assembly being connected to a common transmission shaft coupled with the driving wheels. In parallel-type systems, the heat engine drives some of the driving wheels whereas the electric engines drive the other driving wheels. For example, in the case of a vehicle with front-wheel drive, the heat engine usually drives the front axle system and the electric engines drive the rear axle system.

The category of series-type systems includes the particular case of systems that do not include any decoupling system for the heat engine with the electric engines and the wheels. A particular management of the different engine members is required to avoid jerky and uncomfortable driving conditions.

The patent applications FR2847015, FR2847014 and FR2847321 describe infinitely variable transmission systems with power bypass with electric speed regulator that can comprise one or two compound axle systems. The transmission systems described comprise two power channels over which the elements are distributed. One of the two channels comprises a reduction stage and control means making it possible to regulate the distribution of the power between the two channels. These three patent applications describe transmission systems comprising at least one compound axle system making it possible to immobilize at least one of the inputs of the transmission system. Neither of these two applications proposes any system making it possible to start the heat engine when the vehicle is rolling and without the use of a starter.

The patent application JP2000-238555 describes a hybrid system comprising a heat engine and two electric engines. One of the two electric engines is permanently assigned to the propulsion of the vehicle whereas the second engine is used mainly to start the heat engine. This patent application also describes a system for controlling the state of operation of a heat engine based on the detection of the temperature of the engine, its fuel consumption, vibrations and emitted polluting emissions. This device for determining the state of operation of the heat engine is limited by the influence of the environmental conditions on the various parameters analyzed and by the associated computation times and costs. The hybrid operating mode uses a drive train based on a decoupling between the heat engine and the wheel. The effectiveness of such a system is potentially limited.

Reciprocating propulsion systems are recognized as being particularly effective when the aim is to reduce the emissions of greenhouse gases and pollutants. However, even when they are used in a mostly electric operating mode, the reciprocating propulsion systems, for example hybrid power units, keep the internal combustion engine operating at low rotation speed. To achieve an objective of zero polluting emissions, notably in urban operation, it is advantageous to have a hybrid power unit that can operate in purely electric mode, but that remains capable of reactivating said heat engine in a manner that is imperceptible to the driver. While implementing such an operating mode is easier in the case of a parallel-type hybrid propulsion, the situation is quite different in the case of a series-type hybrid propulsion.

In practice, the absence of decoupling of the heat engine from the transmission in a system equipped with an infinitely variable transmission prohibits the stopping of the heat engine. In practice, stopping would involve immobilizing the transmission and eliminating the torque transmitted to the wheels. A system that makes it possible to circumvent this limitation is necessary, together with a means of bringing the heat engine to a rotation speed that is sufficient to take over from the electric engines in the propulsion of the vehicle, in an independent manner.

SUMMARY OF THE INVENTION

The present invention proposes a method for managing the heat engine in a hybrid vehicle with power bypass that allows said engine to start when only the electric machines are participating in the propulsion of the vehicle.

The present invention also proposes a method for managing the starting of a heat engine in several phases, based on the detection of the operation of the heat engine and that improves the comfort of the drive.

A method for controlling a hybrid power unit with power bypass for an automobile provided with at least two driving wheels, the power unit comprising a heat engine, at least two electric machines, and an infinitely variable transmission mechanically connecting the heat engine, the two electric machines and the driving wheels.

While the control method is being applied, the initially stopped heat engine is brought, in an independent manner and in several operating phases, to a rotation speed that is sufficient to be able to participate in the propulsion of the vehicle, said vehicle moving under the action of the electric machines.

In other words, the control method makes it possible to bring the heat engine from a zero rotation speed to a rotation speed that is compatible with starting. The rotation speed is increased by a partial coupling of the torque supplied by the electric machines. Until ignition, the heat engine supplies a resisting torque. The heat engine, after ignition, supplies an engine torque. The operating phases make it possible to take account of the different rotation speeds and of the different torques supplied by the heat engine. Since the heat engine is made to rotate by diverting a proportion of the torque supplied by the electric machines, it can be considered that the heat engine is made to start independently, with no assistance external to the vehicle.

At least three operating phases can be defined by comparing the rotation speed of the heat engine with at least one stored first value and one stored second value.

During a first operating phase defined by a rotation speed of the heat engine below the first stored value, the two electric machines can be controlled in open loop mode relative to the rotation speed of the heat engine in order for the heat engine to reach a rotation speed that is sufficient to be detected.

During a second operating phase defined by a rotation speed of the heat engine between the first stored value and the second stored value, the two electric machines can be controlled in closed loop mode relative to the rotation speed of the heat engine in order for the heat engine to reach a rotation speed that is sufficient to enable said heat engine to start.

During a third operating phase defined by a rotation speed of the heat engine above the second stored value, the heat engine and the two electric machines can be controlled in closed loop mode relative to the rotation speed of the heat engine.

A system for controlling a hybrid power unit with power bypass for an automobile provided with at least two driving wheels, the power unit comprising a heat engine, at least two electric machines, and an infinitely variable transmission mechanically connecting the heat engine, the two electric machines and the driving wheels, the vehicle being also equipped with an electronic control means. The electronic control means comprises a rotation speed estimation means located on the output shaft of the heat engine, an indirect determination means emitting values of the rotation speed of the heat engine, of the wheel resisting torque and of the resisting torque of the heat engine as a function of the rotation speeds of the electric machines and of the heat engine, a means of determining torque setpoints of the heat engine and of the electric machines, a means of determining the operating phase as a function of the rotation speed of the heat engine, a feedback loop making it possible to control the heat engine, and a means of piloting the feedback loop making it possible to deactivate said feedback loop as a function of the current operating phase.

In a control system comprising an interface between the driver and the vehicle, the means of determining the torque setpoints can emit the values of the torque setpoints of the electric machines and of the heat engine as a function of the requests from the driver originating from the interface between the driver and the vehicle, of the resisting torque of the heat engine and of the wheel resisting torque.

In a control system comprising a memory, the means of determining the operating phase can receive the signal emitted by the means of estimating the rotation speed of the heat engine and a signal originating from the memory and emits as output an indication of the current operating phase.

In a control system comprising a means of controlling the heat engine, said control means can emit a signal triggering the starting of the heat engine as a function of the signal received from the phase determination means.

BRIEF DESCRIPTION OF THE DRAWINGS

Other aims, features and benefits will become apparent from reading the following description given solely as a non-limiting example and with reference to the appended drawings in which.

DETAILED DESCRIPTION OF THE INVENTION

Figure 1:
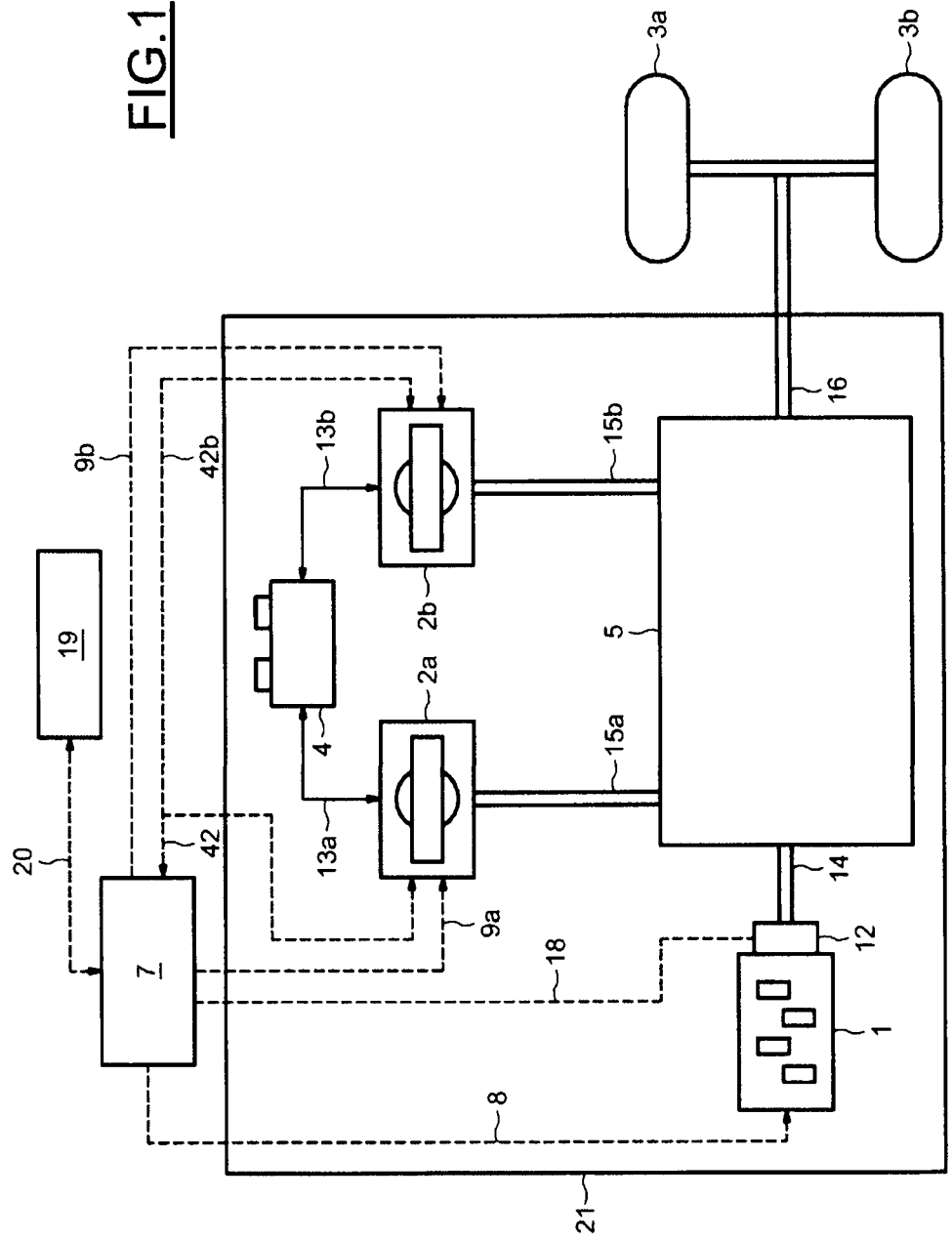
FIG. 1 illustrates the main elements of a control system that makes it possible to start a heat engine when rolling.

FIG. 1 shows the main members of a vehicle equipped with a transmission with power bypass 5, a power unit 21 and a control system 7. The vehicle comprises a heat engine 1, two electric machines 2a and 2b, driving wheels 3a and 3b, a battery 4 and an infinitely variable transmission 5.

The heat engine 1 is mechanically connected to the infinitely variable transmission 5 by the connection 14 in order to transmit torque. The infinitely variable transmission 5 is mechanically connected to a first electric machine 2a by the link 15a, to a second electric machine 2b by the link 15b and to the wheels 3a and 3b by a mechanical link 16 and a torque distribution system. The electric machines 2a and 2b are connected to the battery 4 by the electrical connections 13a and 13b respectively. The heat engine 1 is equipped with a means 12 of estimating the rotation speed.

The infinitely variable transmission 5 handles the diverting and the regulating of the power supplied by the heat engine 1. The two electric machines 2a and 2b operate independently of one another and make it possible either to supply a torque complementing that supplied by the heat engine 1, or supply a resistive torque that is subtracted from that supplied by the heat engine 1, the subtracted power being converted into electrical energy in a recycling manner. It is thus possible to sweep a continuous motive power range without changing the power supplied by the heat engine 1.

The control means 7 is connected to the heat engine 1 by the connection 8, to the electric machine 2a by the connections 9a and 42, to the electric machine 2b by the connections 9b and 42b and to the rotation speed estimation means 12 by the connection 18. The control means 7 is also connected to an interface 19 between the driver and the vehicle by the connection 20 via which the driver can express operation requests or receive information.

The control means 7 checks the rotation speed of the heat engine 1 and controls the injection and ignition of said heat engine via the connection 8. The control means 7 receives requests from the driver from the interface 19.

Figure 2:
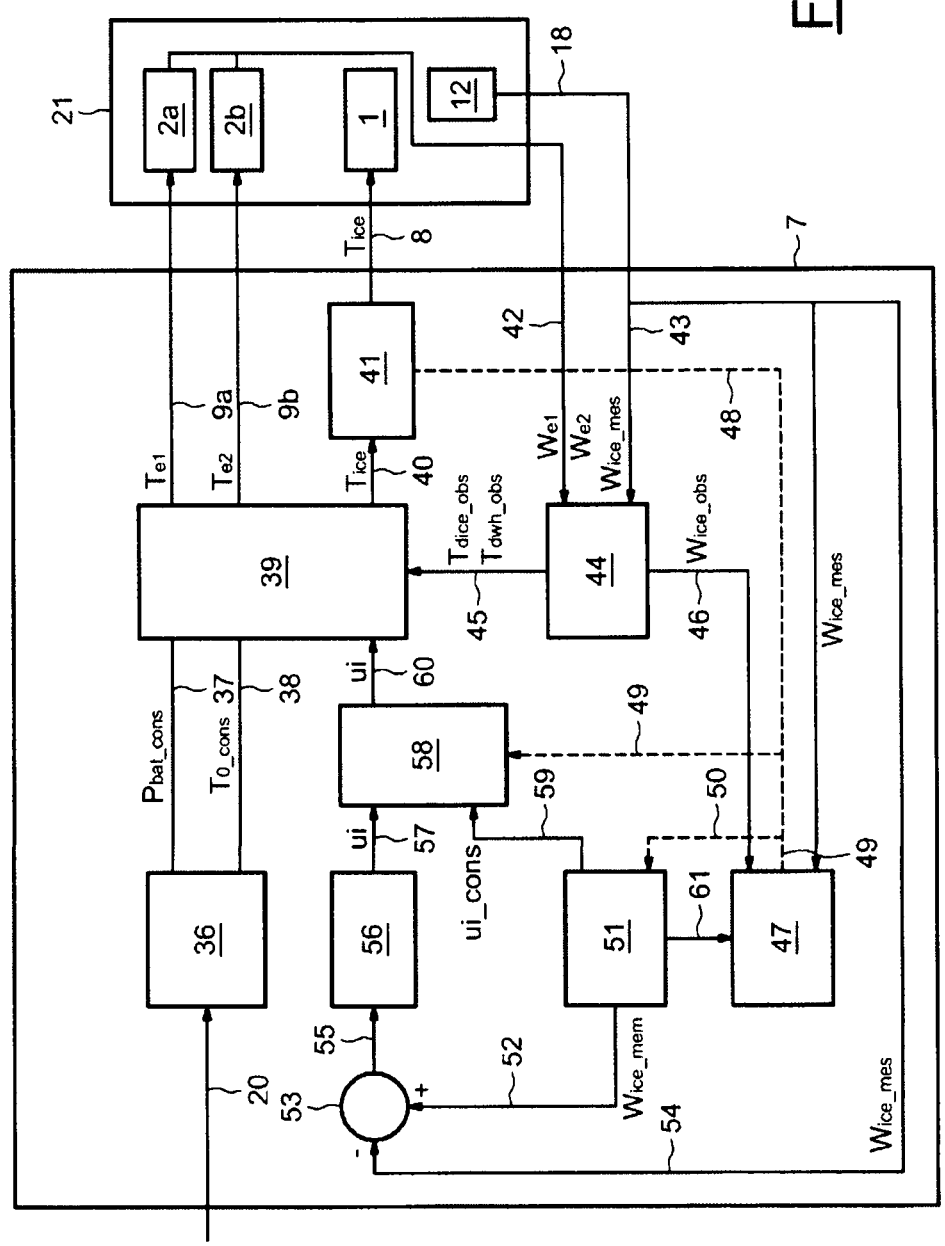
FIG. 2 illustrates the main steps of a control method that makes it possible to start a heat engine when rolling.

The elements included in the control means 7 are represented in FIG. 2. The control means 7 is connected to the interface 19 with the driver by the connection 20. The connection 20 continues to the setpoint determination means 36, which is in turn connected by the connections 37 and 38 to the torque setpoint determination means 39. The torque setpoint determination means 39 is connected by at least one of its inputs to the determination means 44 of the observer by the connection 45 and by the connection 60 to the piloting means 58 of the feedback loop. The torque setpoint determination means 39 is connected by the connection 9a to the electric machine 2a, by the connection 9b to the electric machine 2b and by the connection 40 to the control means 41 of the heat engine.

The determination means 44 of the observer is connected by its inputs to the electric machines 2a and 2b by the connection 42 and the branch 42b, respectively. The determination means 44 is connected by the branch 43 of the connection 18 to the means 12 of estimating the rotation speed of the heat engine 1 and by at least one of its outputs to the operating phase determination means 47 by the connection 46.

The operating phase determination means 47 is connected by the connection 18 to the means 12 of estimating the rotation speed of the heat engine 1, by at least one of its outputs to the control means 41 of the heat engine by the connection 48, to the piloting means 58 of the feedback loop by the connection 49 and to the memory 51 by the branch 50 of the connection 49. The operating phase determination means 47 is connected by one of its inputs to the memory 51 via the connection 61.

The memory 51 is connected by the connection 52 to the subtractor 53, which is in turn connected to the computer 56 by the connection 55. The subtractor 53 is connected to the means 12 of estimating the rotation speed of the heat engine 1 by the branch 54 of the connection 18.

The computer 56 is connected to the piloting means 58 of the feedback loop by the connection 57. The piloting means 58 is connected by at least one of its inputs by the connection 59 to the memory 51 and by the connection 49 to the operating phase determination means 47. The piloting means 58 of the feedback loop is connected by its output to the torque setpoint determination means 39 by the connection 60.

The purpose of the control device is to progressively raise the rotation speed of the heat engine without activating its operation. For this, several phases are defined and detected and make it possible to bring the heat engine 1 to a desired rotation speed. The regulation of the power unit during these phases is handled either in closed loop mode or in open loop mode. The feedback loop comprises in particular the determination means 44 of the observer, the operating phase determination means 47, and the control means 41 of the heat engine, and is controlled by the piloting means 58.

The memory 51 contains in particular values Wice1, Wice2 and Wice3 delimiting three operating phases. These values are communicated to the operating phase determination means 47 by the connection 61. The operating phase determination means 47 then compares said values to the observed value of the rotation speed Wice_obs of the heat engine obtained from the determination means of the observer 44 in order to determine the current operating phase.

A first phase is handled in open loop mode, until the rotation speed is sufficient to be able to measure said rotation speed. The second phase is handled in closed loop mode so as to bring the heat engine to a sufficient rotation speed to produce the ignition thereof in a manner that is imperceptible to the driver, that is to say without jerks or without notable loss of motive power. The ignition is produced during the second phase before the rotation speed reaches the idle speed Wice2.

During the third phase, the heat engine is brought to a sufficient rotation speed for it to be able to contribute to the propulsion of the vehicle. Said rotation speed should also make it possible to limit the risks of stalling the heat engine.

In operation, the control means 7 receives the requests from the driver by the connection 20. These requests are converted into operating setpoints by the setpoint determination means 36. A setpoint value of the power passing through the battery Pbat_cons is emitted by the connection 37, and a setpoint value of the wheel torque T0_cons is emitted by the connection 38.

The determination means 44 of the observer receives, by the connection 42, the values of the rotation speeds We1 and We2 of the electric machines 2a and 2b respectively. The determination means 44 of the observer also receives the value of the rotation speed Wice_mes of the heat combustion engine 1 by the connection 43. The determination means 44 of the observer emits, by its outputs, an observed value of the wheel resisting torque Tdwh_obs and an observed value of the heat engine resisting torque Tdice_obs by the connection 45. The determination means 44 of the observer also emits, by at least one of its outputs, the observed value of the rotation speed of the heat engine Wice_obs to the operating phase determination means 47 by the connection 46. The expression "observed value" should be understood to mean a value that is indirectly estimated by a computation means from one or more other measured values.

The operating phase determination means 47 receives the value of the rotation speed of the heat engine Wice_mes by the connection 18, and the values determining the first, second and third operating phases, Wice1, Wice2 and Wice3 from the memory 51. The phase determination means 47 compares the values Wice1, Wice2 and Wice3 and the values Wice_mes and Wice_obs.

In a first stage, the determination means 47 estimates the value to be considered from Wice_obs and Wice_mes.

If Wice_obs<Wice1, then Wice=Wice_obs
If Wice_obs>Wice1, then Wice=Wice_mes

In a second stage, the determination means 47 estimates the current phase of the power unit. For this, the value of Wice is compared to the values Wice1, Wice2 and Wice3.

If Wice1<Wice, then the first phase is detected.
If Wice2>Wice>Wice1, then the second phase is detected.
If Wice3>Wice>Wice2, then the third phase is detected.

Depending on the phase detected, a corresponding signal is emitted by the connection 49.

In parallel, the branch 50 of the connection 49 enables the memory 51 to receive an indication of the current phase in order to emit a stored value of the rotation speed of the heat engine Wice_mem corresponding to said phase. The memory 51 contains a number of stored values of the rotation speed of the heat engine, corresponding to the different operating phases of said heat engine. The value Wice_mem is emitted by the connection 52 to the subtractor 53. The subtractor 53 receives, by another of its inputs, the measured value of the rotation speed of the heat engine Wice_mes from the means 12 of estimating the rotation speed of the heat engine 1. The subtractor 53 emits, by the connection 55, a value corresponding to the subtraction of the stored value from the current value.

The computer 56 determines the variable ui by applying the following equation:

during the phase 2:

$$ui = -K_2 \cdot (Wice\_obs - Wice2)$$

and $K_2$ = a constant determined in the laboratory during phase 3:

$$ui = -K_3 \cdot (Wice\_obs - Wice3)$$

and $K_3$ = a constant determined in the laboratory

The variable ui is transmitted by the connection 57 to the piloting means 58 of the feedback loop. The piloting means 58 receives, from the memory 51, a setpoint value ui_cons of the variable ui. The connection 49 enables the piloting means 58 of the feedback loop to receive an indication of the current phase in order to enable it to choose the value of the variable ui to be transmitted to the torque setpoint determination means 39.

If the phase indication corresponds to the first phase, the setpoint value ui_cons of the variable ui is chosen. If the phase indication corresponds to the second phase or to a subsequent phase, the value of the variable ui from the computer 56 is chosen.

The torque setpoint determination means 39 estimates the torques of the electric machines 2a and 2b, respectively Te1 and Te2, and the torque of the heat engine Tice. The calculation used to obtain the three torques differs according to the operating phase of the power unit.

During the first phase, $$\begin{cases} ui\_cons = Tice\_obs - a \cdot Te1 - b \cdot Te2 - c \cdot Tdwh\_obs \\ T0\_cons = \alpha \cdot Te1 + \beta \cdot Te2 + \gamma \cdot Tdice\_obs + Tdwh\_obs \end{cases}$$

in which a, b, c, $\alpha$, $\beta$, $\gamma$ are known physical parameters dependent on the transmission.

Tdice_obs is the observed value of the resisting engine torque.

During the second phase, $$\begin{cases} ui = Tice\_obs - a \cdot Te1 - b \cdot Te2 - c \cdot Tdwh\_obs \\ T0\_cons = \alpha \cdot Te1 + \beta \cdot Te2 + \gamma \cdot Tdice\_obs + Tdwh\_obs \end{cases}$$

with $ui = -K_2 \cdot (Wice\_obs - Wice2)$ and $K_2$ = a constant determined in the laboratory During the third phase, $$\begin{cases} ui = a \cdot Te1 + b \cdot Te2 + c \cdot Tice + d \cdot Tdwh\_obs \\ T0\_cons = \alpha \cdot Te1 + \beta \cdot Te2 + \gamma \cdot Tice + \delta \cdot Tdwh\_obs \end{cases}$$

with $\delta$ being another known physical parameter dependent on the transmission $$ui = -K_3 \cdot (Wice\_obs - Wice3) \text{ and}$$

$K_3$ = a constant determined in the laboratory.

It should be noted that, during the third phase, the engine is active and controllable. The resisting torque Tdice_obs is therefore replaced by the engine torque Tice.

The duly defined system of equations comprises three unknowns for two equations. In order to determine the third unknown, an arbitrary torque of the heat engine is assumed, for example $$Tice=(\max(Tice(Wice3))+\min(Tice(Wice3)))/2.$$

The duly described torque values Te1, Te2 and Tice are emitted toward the corresponding engine members. It should be noted that the torque value of the heat engine is not emitted directly to the heat engine. A control means 41 of the heat engine receives the value of the torque Tice and an indication of the current operating phase by the connection 48. Thus, the torque value Tice is transmitted to the heat engine only if the power unit is in the third operating phase. Otherwise, a zero setpoint is transmitted.

The system and the method for controlling the power unit make it possible to control the heat engine of a hybrid power unit in order to bring it from a zero rotation speed to a sufficient rotation speed to initiate its starting. From an idle speed, the control system brings the heat engine to a rotation speed that is sufficiently high to be able to participate in the propulsion of the vehicle.

The control system mainly uses a closed-loop mode control so that the raising of the rotation speed is rapid but progressive. Thus, the starting of the heat engine is imperceptible to the driver.

The invention claimed is:

1. A method for controlling a hybrid power unit with power bypass for an automobile including at least two driving wheels, the hybrid power unit including a heat engine, at least two electric machines, and an infinitely variable transmission mechanically connecting the heat engine, the two electric machines, and the driving wheels, the method comprising:
bringing an initially stopped heat engine, in an independent manner and in plural operating phases, to a rotation speed that is sufficient to be able to participate in propulsion of the vehicle, the vehicle moving under action of the electric machines, and
during a first operating phase defined by a rotation speed of the heat engine below a first stored value, controlling the two electric machines in an open loop mode relative to the rotation speed of the heat engine for the heat engine to reach a rotation speed that is sufficient to be detected,
wherein at least three operating phases are defined by comparing the rotation speed of the heat engine with at least one stored first value and one stored second value.

2. The control method as claimed in claim 1, wherein, during a second operating phase defined by a rotation speed of the heat engine between the first stored value and the second stored value, the two electric machines are controlled in a closed loop mode relative to the rotation speed of the heat engine for the heat engine to reach a rotation speed that is sufficient to enable the heat engine to start.

3. The control method as claimed in claim 1, wherein, during a third operating phase defined by a rotation speed of the heat engine above the second stored value, the heat engine and the two electric machines are controlled in a closed loop mode relative to the rotation speed of the heat engine.

4. A system for controlling a hybrid power unit with power bypass for an automobile including at least two driving wheels, the system comprising:
a power unit including:
a heat engine,
at least two electric machines, and
an infinitely variable transmission mechanically connecting the heat engine, the two electric machines and the driving wheels;
an electronic control unit, the electronic control unit including:
a rotation speed estimation unit located on an output shaft of the heat engine,
an indirect determination unit emitting values of rotation speed of the heat engine, of wheel resisting torque, and of resisting torque of the heat engine as a function of rotation speeds of the electric machines and of the heat engine,
a torque determining unit configured to determine torque setpoints of the heat engine and of the electric machines,
an operating phase determining unit configured to determine an operating phase as a function of the rotation speed of the heat engine,
a feedback loop making it possible to control the heat engine, and
a pilot unit configured to pilot the feedback loop making it possible to deactivate the feedback loop as a function of a current operating phase.

5. The control system as claimed in claim 4, further comprising an interface between a driver and the vehicle, the torque determining unit emitting values of the torque setpoints of the electric machines and of the heat engine as a function of requests from the driver originating from the interface between the driver and the vehicle, of the resisting torque of the heat engine, and of the wheel resisting torque.

6. The control system as claimed in claim 4, further comprising a memory, the operating phase determining unit receiving a signal emitted by the rotation speed estimation unit and a signal originating from the memory, and emitting as an output an indication of the current operating phase.

7. The control system as claimed in claim 6, further comprising a heat engine control unit that emits a signal triggering starting of the heat engine as a function of the signal received from the operating phase determining unit.

* * * * *